Feb. 20, 1951  W. FLAJOLE  2,542,406
ELECTRIC TOASTER
Filed April 12, 1946  5 Sheets-Sheet 1

INVENTOR
WILLIAM FLAJOLE
BY Robert A. Sloman
ATT'Y

Feb. 20, 1951 W. FLAJOLE 2,542,406
ELECTRIC TOASTER
Filed April 12, 1946 5 Sheets-Sheet 2

INVENTOR
WILLIAM FLAJOLE
BY Robert A. Sloman
ATT'Y.

Feb. 20, 1951 W. FLAJOLE 2,542,406
ELECTRIC TOASTER
Filed April 12, 1946 5 Sheets-Sheet 3

INVENTOR
WILLIAM FLAJOLE
BY Robert A. Sloman
ATT'Y

Feb. 20, 1951  W. FLAJOLE  2,542,406
ELECTRIC TOASTER
Filed April 12, 1946  5 Sheets-Sheet 4

INVENTOR
WILLIAM FLAJOLE
BY Robert A. Sloman
ATTY

Feb. 20, 1951 W. FLAJOLE 2,542,406
ELECTRIC TOASTER
Filed April 12, 1946 5 Sheets-Sheet 5

INVENTOR
WILLIAM FLAJOLE
BY:
Robert A. Sloman
ATT'Y.

Patented Feb. 20, 1951

2,542,406

UNITED STATES PATENT OFFICE 2,542,406

ELECTRIC TOASTER

William Flajole, Detroit, Mich.

Application April 12, 1946, Serial No. 661,589

4 Claims. (Cl. 99—391)

This invention relates to an electric toaster and more particularly to a toaster with a toast storage and heat maintaining compartment.

It is the object of this invention to provide a compartment forming a part of the electric toaster whereby a plurality of pieces of toast may be stored and kept warm subsequent to toasting.

It is the object of this invention to provide in an electric toaster means for uniformly toasting a plurality of horizontally spaced pieces of bread.

It is the further object herein to provide means for automatically and simultaneously ejecting the plurality of pieces of toast into the storage compartment in a stack after the toasting operation.

It is the further object of this invention to provide a manually compressed spring actuated toast ejecting mechanism, together with a timer adapted to automatically release the ejecting mechanism after a predetermined toasting interval.

It is the further object of this invention to provide a plurality of horizontally spaced toast supporting grills carried by the toaster door, together with means for outwardly swinging the toast ejectors with the grills as the door is manually swung open for loading.

These and other objects will be seen from the following specifications and claims in conjunction with the appended drawings in which:

It will be understood that the above drawings illustrate merely one preferable embodiment of the invention, and that other embodiments are contemplated within the scope of the claims hereinafter set out.

Figure 1:
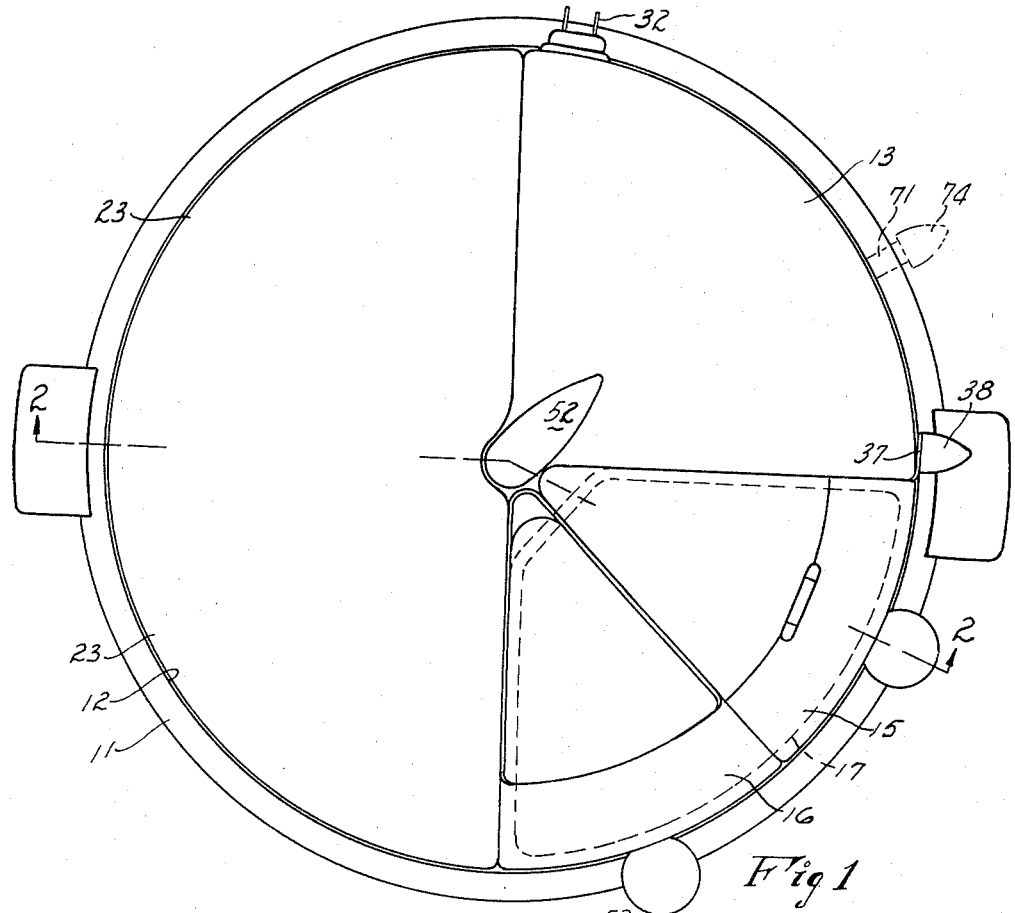
Figure 1 is a top plan view of the toaster and storage compartment.
Figure 2:
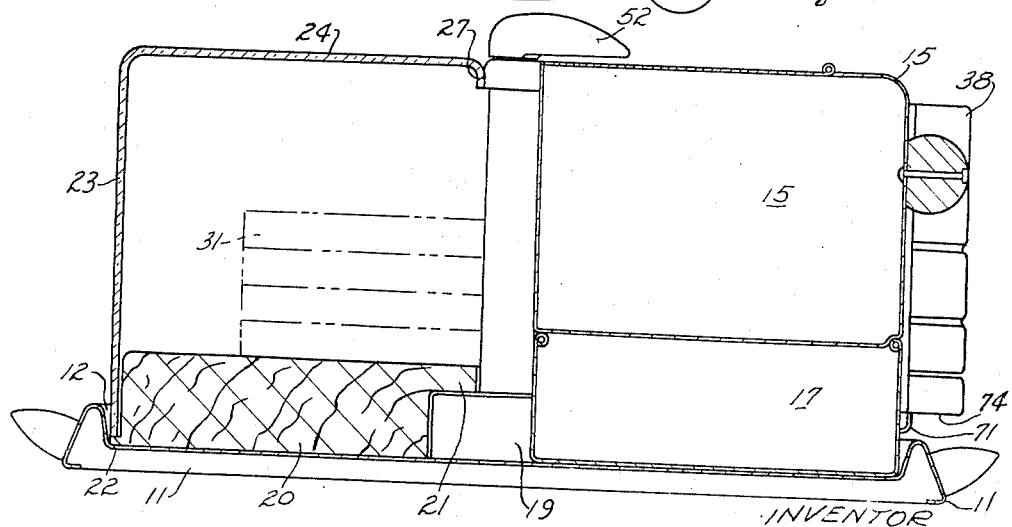
Figure 2 is an elevational section thereof on line 2—2 of Figure 1.

Referring to the drawings, Figures 1 and 2, the electric toaster unit consists of a formed circular base 11 centrally concaved at 12 to provide a retaining platform for toaster mechanism 13, toast storage member 23, sugar receptacle 15, creamer 16, and butter dish 17.

Figure 3:
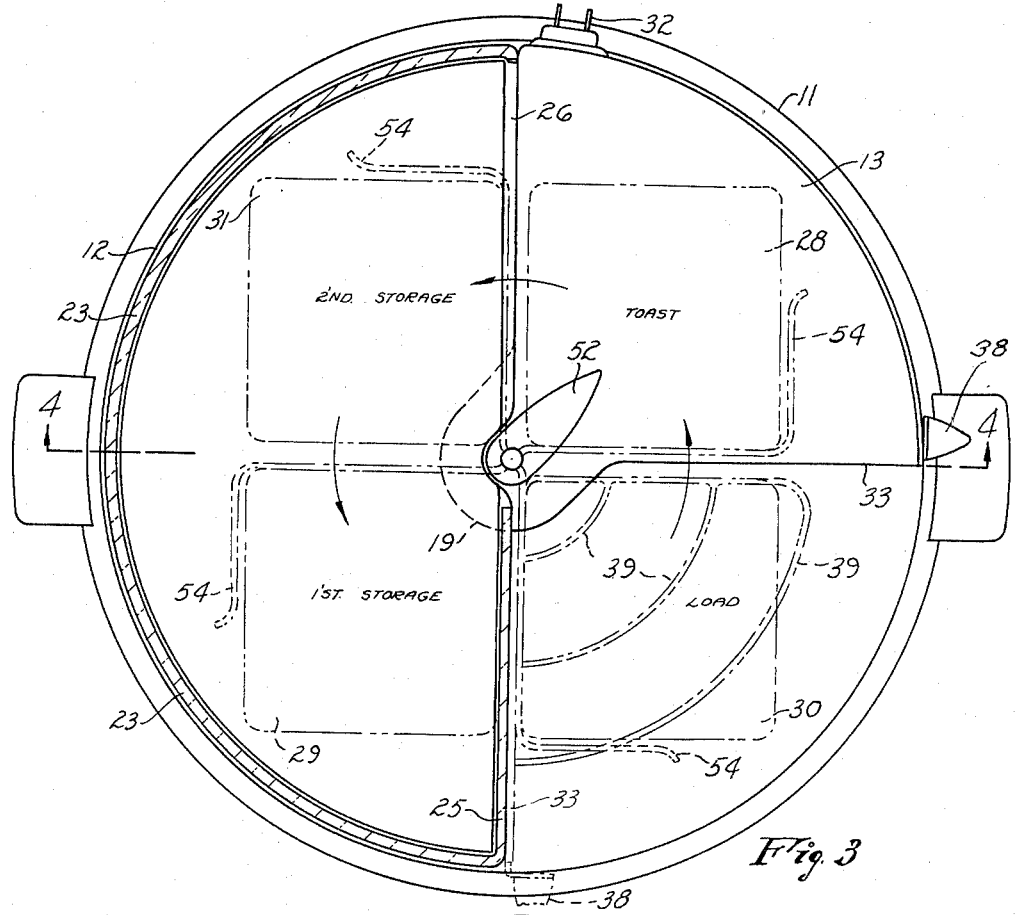
Figure 3 is a partially sectioned plan view of the toaster with the section taken on line 3—3 of Figure 4.
Figure 4:
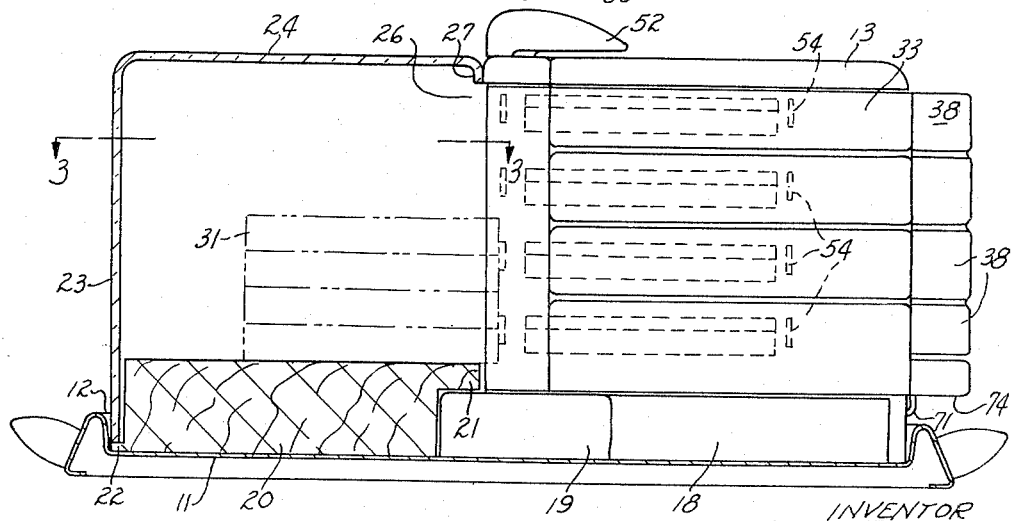
Figure 4 is an elevational section thereof on line 4—4 of Figure 3.
Figures 5, 6:
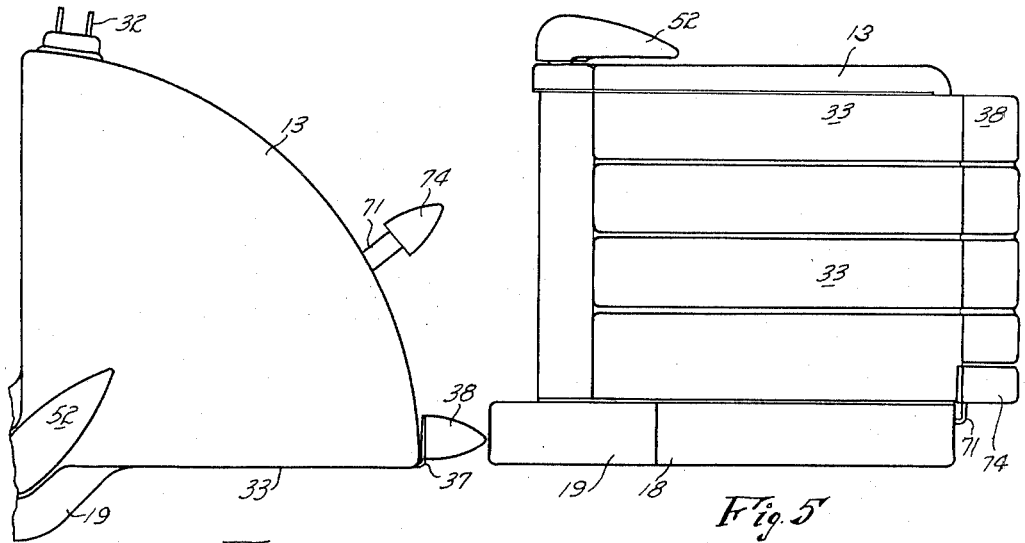
Figure 5 is an elevational view of the toaster mechanism.
Figure 6 is a top plan view thereof.

Referring to Figures 3 and 4, the toaster mechanism has a hollow base 18 which is substantially in the shape of a 90-degree sector with the central enlarged curved projecting portion 19, which is also illustrated in Figure 6.

A preferably hard wood semi-circular toast storage platform 20 is positioned upon and within platform 11, with the underside of its central portion being undercut to form a central extension 21 which rests upon a portion of projecting member 19 or toaster base 18. A semi-circular projecting ledge or flange 22 is also formed at the bottom of wooden platform 20 upon which rests the hollow formed semi-circular Plexiglas toast storage member 23.

Figure 7:
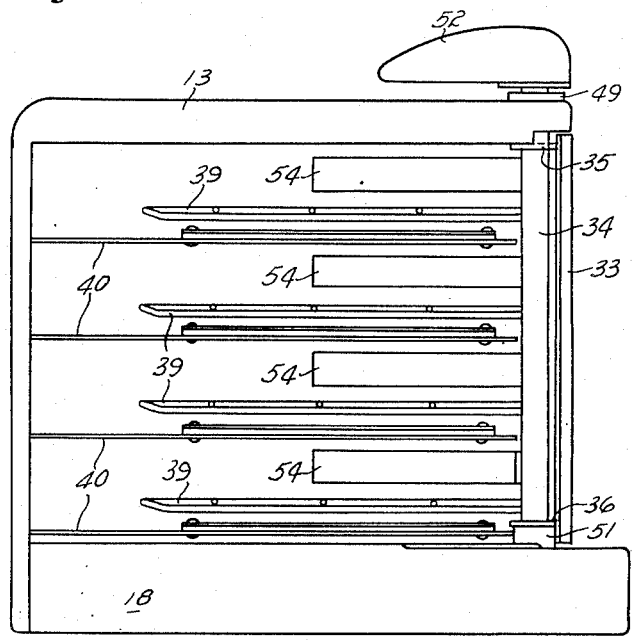
Figure 7 is a left end elevational view thereof.

Storage member 23 has a continuous semi-circular side wall, a continuous top surface 24 and the inner side wall surface 25. A rectangular opening 26 is formed in a portion of side wall 25, with said opening coinciding with the open discharge side of toaster 13, which is illustrated in Figure 7. It will be noted that side wall portion 27 projects across the top of opening 26 as shown in Figures 2 and 4.

Referring to Figure 3, the bread 28 to be toasted is shown in dotted lines. Toast in a stack of four is ejected from toaster 13 in the manner hereafter described, and projected through opening 26 in storage member 23 to the dotted line position illustrated at 29. Four more pieces of bread shown in loading position 30 are toasted in the position 28 and ejected to the position 31 i. e. the remaining space within storage chamber member 23.

A third set of four slices of bread may be loaded at 30 and toasted at 28. But due to the position of stored toast 31 will not be ejected until toast 31 is removed, but on the other hand will be stored and kept warm within toaster housing 13.

While the preferable embodiment herein illustrates toasting four slices of bread at one time with facilities for the storage of twelve pieces of toast, it is understood that this is merely by way of example as the principle herein described is applicable for toasting one or more pieces of toast at a time.

Figures 1 and 3 show the electrical intake plug connections 32 for providing electrical energy to the electric resistance toasting elements hereinafter described, which are joined thereto in any convenient manner. The description hereafter relates more specifically to the toaster 13, its construction and its operating mechanism.

Figure 10:
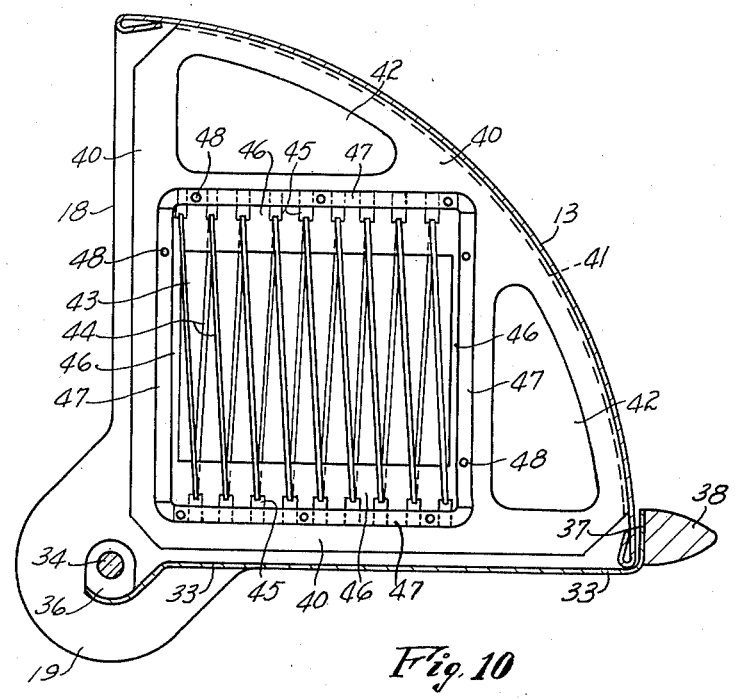
Figure 10 is a plan section on line 10—10 of Figure 8.

Referring to Figures 5, 6 and 7, toaster 13 consists of a hollow base 18 with its hollow circular projection 19. Toaster door 33 is positioned above hollow base 18 and is vertically hinged at its left edge to shaft 34 by the two bearing members 35 and 36 which are welded to said door as illustrated in Figures 8 and 10, and through which said shaft loosely projects.

As illustrated in Figures 6, 9, 10 and 11, door 33 terminates at its right vertical edge in the rearwardly bent portion 37 to which is secured the formed Bakelite or other heat insulating handle 38.

Figure 8:
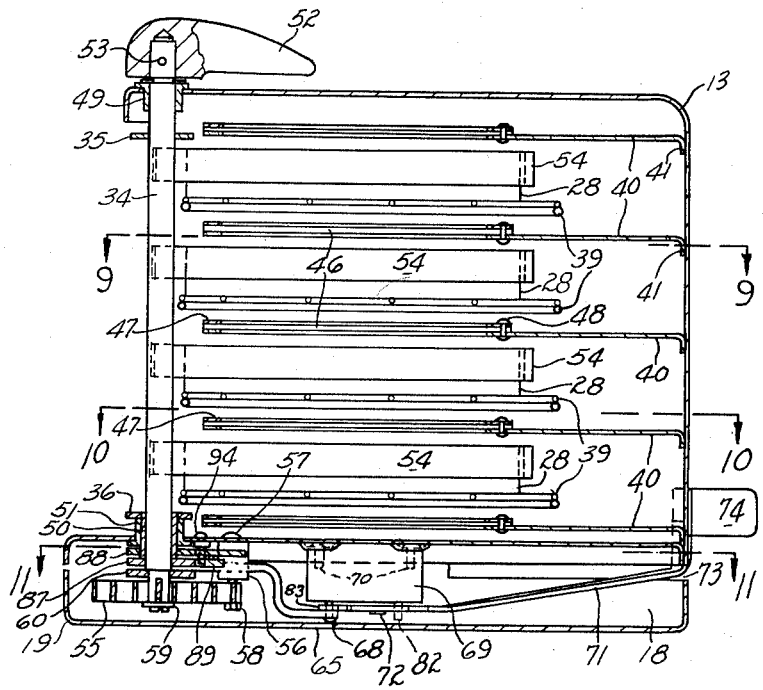
Figure 8 is an elevational section thereof, with the section taken on line 8—8 of Figure 11.
Figure 9:
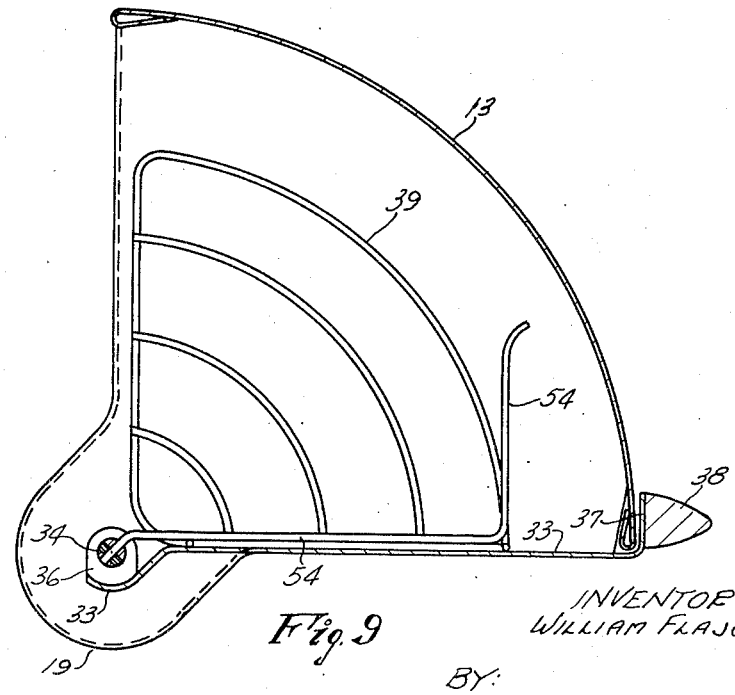
Figure 9 is a plan section on line 9—9 of Figure 8.

Wire grills 39 Figures 7, 8 and 9 are secured to the inner wall of door 33 and project within the toaster housing 13 when the door is closed, as illustrated in Figure 9, for holding four slices of bread in horizontal spaced relation.

In Figure 3 the door is shown in dotted lines as swung open 90° to permit respective loading of grills 39. The loaded grills are projected back into the toaster when the door is closed.

Referring to Figures 7, 8 and 10, there are a plurality of electric element supporting plates 40 which are substantially 90° sectors, and which have a peripheral downwardly projecting flange 41 which is welded or otherwise secured to the inner arcuate wall of toaster housing 13. These plates shown in plan in Figure 10 are arranged in spaced relation so that the respective grills 39 loaded with bread may be projected therebetween.

Referring to Figure 10 plates 40 are punched out at 42 for lightness and at 43 for carrying the resistance heating wire coils 44. Said resistance wire is spirally wound around and through the oppositely arranged spaced notches 45 which are formed within the mica support 46.

The latter are mounted upon plates 40 over openings 43 and secured thereto at their edges by the metal strips 47 which are riveted at 48 to plate 40. Thus the resistance heating coils 44 suitably joined to current intake connection 32, are respectively carried upon each plate 40 in insulated relation.

Referring to Figures 7, 8 and 9, shaft 34 is vertically and rotatively journaled through upper bushing 49 which is positioned through the top portion of toaster housing 13. Bushing 50 loose on shaft 34 at its lower end is rotatively journaled within stationary bushing 51 which projects up from and is carried by toaster base member 19. A handle 52 is secured by pin 53 to the upper end of shaft 34 for effecting rotative setting adjustment thereof as desired.

Formed ejectors 54, Figures 7, 8 and 9, project through spaced transverse slots formed in shaft 34, and are maintained thereby in a horizontal position as illustrated in Figures 7 and 8. The latter figures show that said ejectors are positioned to be aligned with the edges of the toast carried on the respective grills 39. Said ejectors are adapted to forcefully project the toast from the toaster housing 13 after the proper toasting interval. As illustrated in Figure 3 ejectors 54 are adapted to assume any of the four positions shown in dotted lines.

In loading, it is necessary that ejectors 54 be projected outwardly 90° so as to be in back of the bread 30. Consequently as door 33 is manually opened, means are employed hereafter described for simultaneously turning shaft 34 90°.

In closing door 33 shaft 34 is returned to its initial position and ejectors 54 assume the position shown in Figure 3 relative to the bread 28.

After the toasting operation shaft 34 is rotated 180° by coiled spring 55 which is joined to the lower end of shaft 34. This places ejector 54 within the storage member 23 back of toast 29.

When the second set of toast is prepared it is ejected into the remaining space within storage chamber 23, i. e. as indicated at 31. Here the ejectors have rotated only 90° approximately, with further rotational movement being prevented by the second stack of toast 31 engaging the first stack 29.

Referring to Figure 8 the outer or free end of coil spring 55 is joined to the reduced lower portion of stationary stud 56 which is riveted at 57, and which extends downwardly within hollow toaster base 18. Nut 58 is threaded on the lower end of stud 56 to retain the spring thereon.

It will be noted that the inner end of spring 55 projects within a slot in the bottom of shaft 34 and is retained therein by snap washer 59.

Lower cam 60 secured to the lower reduced end of shaft 34 is operatively engaged by pawl 61 which projects against the step portion 62 of cam 60. Pawl 61 is pivotally mounted and secured upon the bottom end of stud 63 which depends within hollow toaster base 18—19. The upper end of stud 63 extends through the top wall of base 18—19 and is riveted thereto.

The free end of pawl 61 is pivotally joined at 64 to one end of pawl release lever 65. The other end of lever 65 is pivotally joined at 66 to lever 67 which is pivotally mounted at 68 to the underside of timer housing 69.

The timer 69 is carried within hollow base 18 by the four nuts 70. Said timer is provided to regulate the toasting interval, and is adapted to automatically cut off the electric current to the toasting elements.

Manually actuated operating timer lever 71 is pivotally mounted at 72 below timer housing 69, while its other end projects out through a horizontal slot 73 in base 18 and has an operating handle 74 secured thereto.

The inner end of timer arm 71 has a cam surface portion 75 with notched portions 76 and 77.

Electric current from the resistance elements 44 travels through the terminals 78 and 79 which are respectively joined to the contact arms 80 and 81. When the contacts are together current passes through the two terminals 78 and 79. The timer is designed to automatically separate said contacts after a pre-determined toasting interval, which is measured by the extent of the manual adjustment of timer arm 71.

The operating mechanism of the timer per se form no part of the present invention and its description is omitted.

Figure 11:
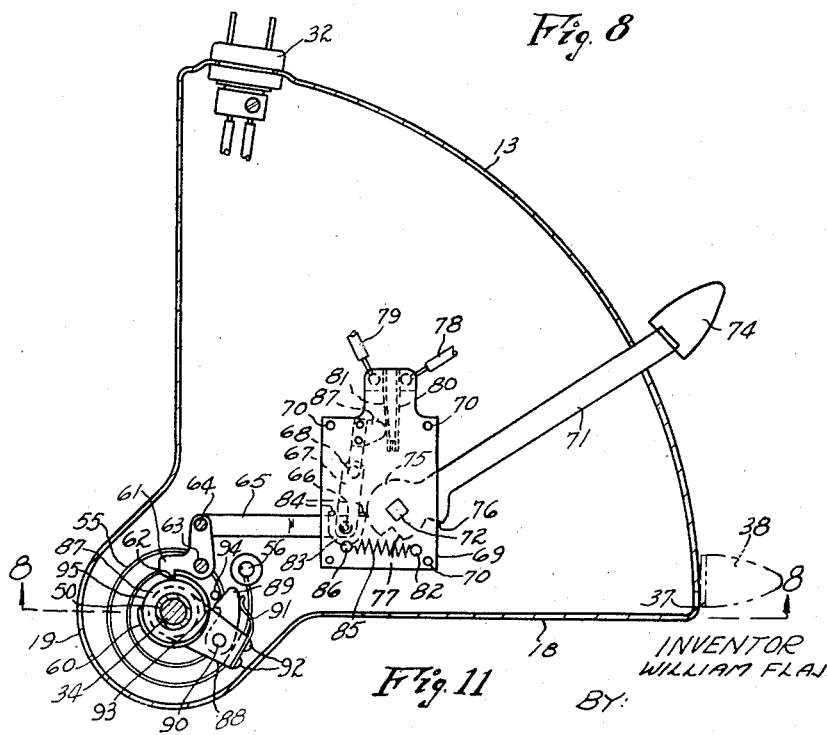
Figure 11 is a plan section on line 11—11 of Figure 8.

Timer arm 71 is manually and horizontally projected to the position shown in Figure 11, and the timing mechanism 69 permits its gradual return after a pre-determined interval till notched portion 76 engages stop pin 82.

In the energized position of timer arm 71 Figure 11 cam surface 75 has operatively engaged the lost motion compensating disc 83 which is also pivotally mounted on lever connection 66. Disc 83 is positioned below lever 67, but has a pair of spaced upwardly formed projections 84 which are adapted to operatively engage opposite edges of lever 67.

Coil spring 85 anchored at one end to stop pin 82 is joined at its other end to disc 66 at point 86 for normally urging lever 65 to the right and also urging the right hand projection 84 against the right edge of lever 67.

Thus as timer arm 71 is projected to the position shown in Figure 11, cam surface 75 operatively engages disc 83 and pivotally projects lever 67 in a clock-wise direction. Insulated member 87 at the end of lever 67 operatively engages contact arm 81 bending it into electrical contact with contact arm 80 so that electric current flows through terminals 78 and 79 and through the electric heating elements of the toaster.

By the time timer 71 has automatically returned to its initial position with notch 76 engaging stop 82, disc 83 falls into notch 77 under the action of coil spring 85. A corresponding movement to the right of lever 65 is also effected, causing a clock-wise movement of pawl 61 which disengages cam 60.

At the same time that timer arm 71 is initially actuated, or just before, handle 52 on the top of shaft 34 is manually rotated 180° bringing cam 60 to the position shown in Figure 11. At the same time coil spring 55 at the bottom of shaft 34 has been compressed. Shaft 34 now under spring tension is retained against return movement by engagement of pawl 61 with the stop 62 on cam 60.

It will be remembered that toast ejectors 54 are in the position shown in Figure 3 just behind the bread being toasted. So that when the timer arm 71 returns to its initial position causing the release of pawl 61 from cam 60, it will be seen that shaft 34 under spring tension immediately revolves 180° carrying ejectors 54 which are secured to said shaft.

The toast is thus ejected from the toaster housing 13 and projected 180° to the first storage position shown within storage compartment 23 Figure 3. Handle 52 is re-wound or turned 180° to again place shaft 34 under spring tension; where it is retained by engagement of pawl 61 with stop 62 of cam 60.

Naturally this has returned ejectors 54 180° to the initial toasting position. However, when the door 33 is opened for reloading, and grills 39 are projected outwardly 90° therewith, it is necessary that toast ejectors be also carried outwardly 90° to be behind the bread as it is loaded upon said grills.

This is accomplished by effecting a further spring compressing turning of shaft 34 an additional 90°.

Referring to Figure 8 upper cam 87 is secured to shaft 34. Bushing 50 which is loose on shaft 34 is secured to door bearing member 36 so that when door 33 is rotatably opened 90°, a corresponding movement of bushing 50 is effected.

Carrier 88 is welded to bushing 50, and pawl 89 is pivotally mounted thereunder at point 90.

Formed leaf spring 91 secured to carrier 88 by screws 92 resiliently engages pawl 89 for projecting the same into operative engagement with step 93 of cam 87.

As the door 33 is closed stop pin 94 which depends within housing 18, is engaged by pawl 89 and disengaged from cam 87. As carrier 88 moves outwardly with door 33 it is seen that pawl 89 also pivots outwardly, and released by pin 94 is urged by spring 91 into operative engagement with step 93 of cam 87.

Thus cam 87 is similarly turned 90° by the action of pawl 89 so that shaft 34 and its ejectors 54 are also outwardly projected as the door is opened.

It will be noted that lower cam 60 has a 90° slot 95 within which pawl 61 rides when the door 33 is open and closed. The shaft 34 is retained against unwinding by cam 87 when the door is open. And then on closing of door 33 said shaft is retained against unwinding by pawl 61.

Having described my invention reference should now be had to the claims which follow for determining the scope thereof.

I claim:

1. In an electric toaster having a housing and charging and discharge openings therein, a plurality of horizontal vertically spaced elements within said housing for toasting a plurality of slices of bread in horizontally spaced relation, an upright rotatable shaft positioned within said housing adjacent to and at one side of its charging opening, a closure door mounted at one vertical edge upon said shaft and positionable across said charging opening, a plurality of horizontal vertically spaced grills lying adjacent said elements and joined to said door for in and out movements therewith relative to said charging opening, and a plurality of horizontal vertically spaced ejecting strips joined at their one ends to said shaft and engageable with said slices for projecting the same through said discharge opening.

2. In a toaster having a housing and spaced charging and discharge openings therein, a vertical shaft rotatably journaled within said housing adjacent to and at one side of said charging opening, a horizontal toast ejecting arm secured at one end to said shaft for rotation therewith, a door pivotally mounted on said shaft and positionable across said charging opening, and means on said door and rotatable therewith operatively engaging said shaft for turning the same to carry said ejecting arm outwardly of said charging opening with said door upon opening thereof.

3. In a toaster having a housing and spaced charging and discharge openings therein, a vertical shaft rotatably journaled within said housing adjacent to and at one side of said charging opening, a horizontal toast ejecting arm secured at one end to said shaft for rotation therewith, a door pivotally mounted on said shaft and positionable across said charging opening, means on said door and rotatable therewith operatively engaging said shaft for turning the same to carry said ejecting arm outwardly of said charging opening with said door upon opening thereof, and a horizontal toast supporting grill within said housing and joined to said door and movable therewith for in and out movements relative to said charging opening.

4. In a toaster having a housing and spaced charging and discharge openings therein, a vertical shaft rotatably journaled within said housing adjacent to and at one side of said charging opening, a horizontal heating element within said housing for toasting a slice of food in horizontal position, a horizontal ejecting arm secured at one end to said shaft for rotation therewith, a door pivotally mounted on said shaft and positionable across said charging opening, a horizontal food supporting grille within said housing adjacent said element and joined to said door and movable therewith for in and out movements relative to said charging opening, a carrier plate joined to said door and loosely journaled on said shaft, a pawl pivotally mounted on said plate, and a notched cam secured on said shaft adjacent said pawl, with said pawl operatively engageable within the notch of said cam for rotating said shaft upon opening movement of said door to carry said ejecting arm outwardly of said housing through said charging opening.

WILLIAM FLAJOLE.

REFERENCES CITED

The following references are of record in the file of this patent:

UNITED STATES PATENTS

| Number | Name | Date |
|---|---|---|
| 1,473,213 | DeMatteis | Nov. 6, 1923 |
| 1,543,737 | Thornton | June 30, 1925 |
| 1,769,973 | Wells | July 8, 1930 |
| 1,852,398 | Bersted | Apr. 5, 1932 |
| 1,862,965 | Maragos | June 14, 1932 |
| 1,888,992 | Lofgren et al. | Nov. 29, 1932 |
| 1,939,247 | Avery et al. | Dec. 12, 1933 |
| 1,971,091 | Anderson | Aug. 21, 1934 |
| 2,027,002 | Spange | Jan. 7, 1936 |
| 2,036,523 | Freemon | Apr. 7, 1936 |
| 2,145,107 | Benander | Jan. 24, 1939 |
| 2,362,415 | Sivley | Nov. 7, 1944 |
| 2,371,084 | Warner | Mar. 6, 1945 |
| 2,429,736 | Wales | Oct. 28, 1947 |